United States Patent
Fukutomi

(10) Patent No.: US 8,355,597 B2
(45) Date of Patent: Jan. 15, 2013

(54) IMAGE PROCESSING DEVICE INCLUDING GRADATION CONVERSION PROCESSOR, NOISE REDUCTION PROCESSOR, AND COMBINING-RAIO CALCULATOR, AND METHOD AND STORAGE DEVICE STORING PROGAM FOR SAME

(75) Inventor: Takeshi Fukutomi, Tokyo (JP)

(73) Assignee: Olympus Corporation, Tokyo (JP)

(*) Notice: Subject to any disclaimer, the term of this patent is extended or adjusted under 35 U.S.C. 154(b) by 281 days.

(21) Appl. No.: 12/827,072

(22) Filed: Jun. 30, 2010

(65) Prior Publication Data
US 2011/0002539 A1 Jan. 6, 2011

(30) Foreign Application Priority Data
Jul. 3, 2009 (JP) ................................. 2009-158837

(51) Int. Cl.
*G06K 9/40* (2006.01)
(52) U.S. Cl. ........ 382/274; 382/254; 382/266; 382/275; 348/234; 348/241; 348/251; 358/448; 358/461; 358/463
(58) Field of Classification Search .................. None
See application file for complete search history.

(56) References Cited

U.S. PATENT DOCUMENTS

| | | | |
|---|---|---|---|
| 6,754,398 B1* | 6/2004 | Yamada | 382/260 |
| 2005/0104974 A1* | 5/2005 | Watanabe et al. | 348/222.1 |
| 2009/0046943 A1* | 2/2009 | Ishiga | 382/266 |
| 2009/0073287 A1* | 3/2009 | Shimizu | 348/234 |
| 2009/0219416 A1* | 9/2009 | Tsuruoka | 348/241 |
| 2010/0066874 A1* | 3/2010 | Ishiga | 348/252 |

FOREIGN PATENT DOCUMENTS

| | | |
|---|---|---|
| JP | 61-157164 A | 7/1986 |
| JP | 2007-312331 A | 11/2007 |

* cited by examiner

*Primary Examiner* — Matthew C Bella
*Assistant Examiner* — Jason Heidemann
(74) *Attorney, Agent, or Firm* — Holtz, Holtz, Goodman & Chick, PC

(57) ABSTRACT

A gradation conversion processor performs gradation conversion processing on image data on the basis of a predetermined gradation conversion characteristic, and a noise reduction processor performs noise reduction processing on the image data. Subsequently, a combining-ratio calculator calculates a combining ratio between the image data before the noise reduction processing performed by the noise reduction processor and the image data after the noise reduction processing on the basis of the gradation conversion characteristic, and a combiner combines the image data before the noise reduction processing performed by the noise reduction processor and the image data after the noise reduction processing on the basis of the combining ratio.

6 Claims, 13 Drawing Sheets

(GRADATION CONVERSION CHARACTERISTIC =
(PIXEL VALUE AFTER GRADATION CONVERSION)/
(PIXEL VALUE BEFORE GRADATION CONVERSION))

| P[i−1, j−1] | P[i, j−1] | P[i+1, j−1] |
| --- | --- | --- |
| P[i−1, j] | P[i, j] | P[i+1, j] |
| P[i−1, j+1] | P[i, j+1] | P[i+1, j+1] |

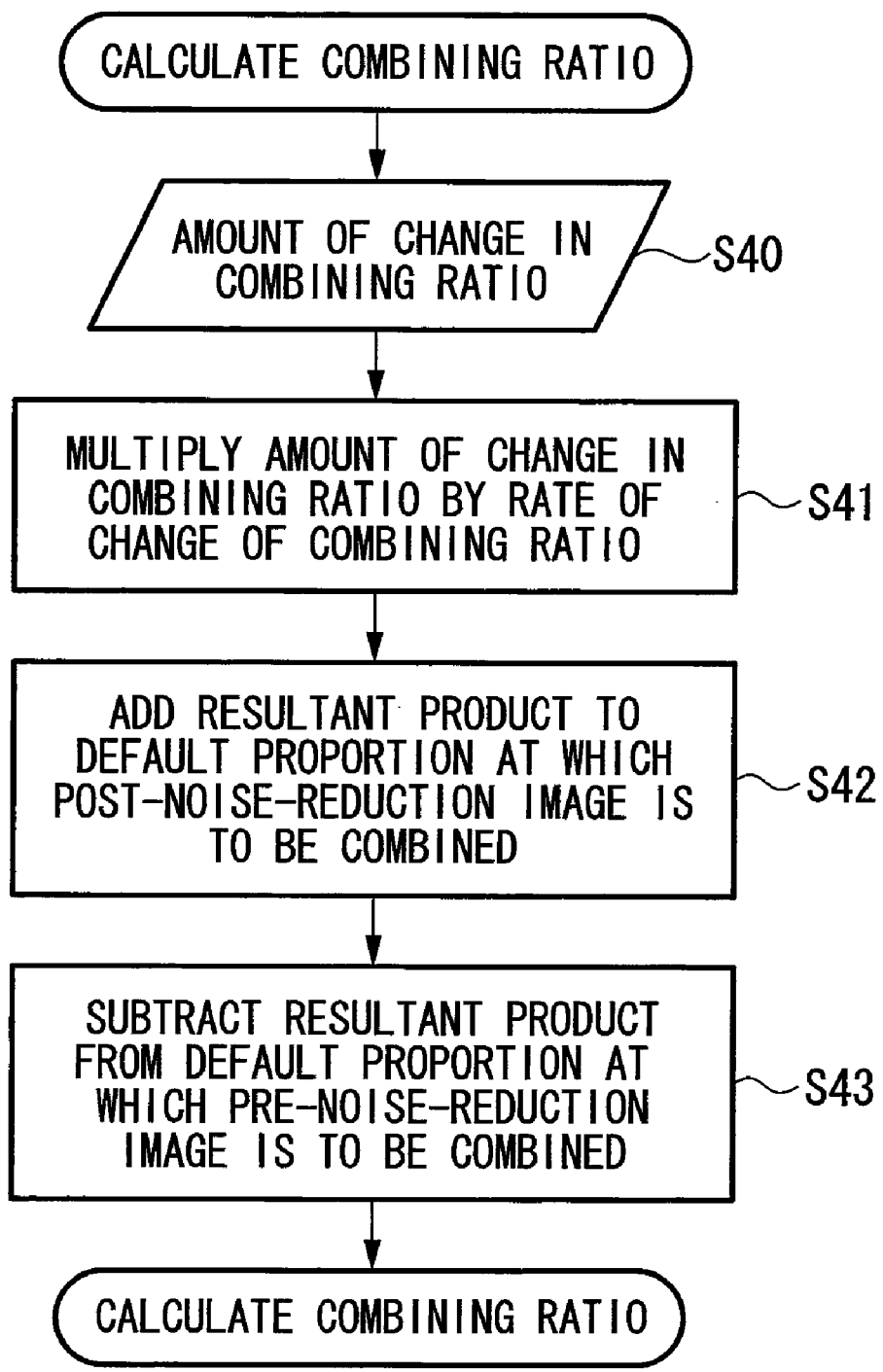

IMAGE PROCESSING DEVICE INCLUDING GRADATION CONVERSION PROCESSOR, NOISE REDUCTION PROCESSOR, AND COMBINING-RAIO CALCULATOR, AND METHOD AND STORAGE DEVICE STORING PROGAM FOR SAME

CROSS REFERENCE TO RELATED APPLICATIONS

This application claims benefit of Japanese Application No. 2009-158837 filed in Japan on Jul. 3, 2009, the content of which is hereby incorporated by its reference.

BACKGROUND OF THE INVENTION

1. Field of the Invention

The present invention relates to image processing devices, image processing methods, and storage media that store image processing programs, and particularly, to an image processing device that performs noise reduction processing on an image, an image processing method, and a computer-readable storage medium that stores an image processing program.

2. Description of Related Art

In the related art, gradation conversion processing is performed on image data so as to control the brightness and the contrast of the image scene. Examples of gradation conversion processing include so-called space-invariant gradation conversion processing in which gradation conversion processing is performed on the entire image on the basis of a single gradation conversion characteristic in the image scene, as in γ-correction, and so-called space-variant gradation conversion processing in which gradation conversion processing is performed by changing the gradation conversion characteristic for individual areas of the image scene so as to expand the dynamic range of the image scene.

However, with either kind of gradation conversion processing, although darker areas of the image scene can be made brighter, there is a problem in that noise in these areas is amplified at the same time. In light of this, Japanese Unexamined Patent Application, Publication No. 2007-312331 discloses a technology for reducing the noise amplified as the result of gradation conversion processing by increasing the magnitude of noise reduction if the gradation conversion characteristic used in the gradation conversion processing has a steep gradient.

On the other hand, performing noise reduction processing can create problems in that it impairs the image sharpness. Although the noise amplified as the result of gradation conversion processing can be reduced in the technology disclosed in Japanese Unexamined Patent Application, Publication No. 2007-312331, there is also a possibility that the image sharpness may be significantly impaired at the same time. Japanese Unexamined Patent Application, Publication No. Sho 61-157164 discloses a technology for performing noise reduction processing while preventing impairment of the image sharpness by detecting edges in a pre-noise-reduction image and then combining the pre-noise-reduction image with a post-noise-reduction image in accordance with the detected edges.

BRIEF SUMMARY OF THE INVENTION

A first aspect of the present invention provides an image processing device that includes a gradation conversion processor that performs gradation conversion processing on image data from an image acquisition system on the basis of a predetermined gradation conversion characteristic; a noise reduction processor that performs noise reduction processing on the image data; a combining-ratio calculator that calculates a combining ratio between the image data before the noise reduction processing performed by the noise reduction processor and the image data after the noise reduction processing on the basis of the gradation conversion characteristic; and a combiner that combines the image data before the noise reduction processing performed by the noise reduction processor and the image data after the noise reduction processing on the basis of the combining ratio.

A second aspect of the present invention provides an image processing method that includes a gradation conversion processing step for performing gradation conversion processing on image data from an image acquisition system on the basis of a predetermined gradation conversion characteristic; a noise reduction processing step for performing noise reduction processing on the image data; a combining-ratio calculating step for calculating a combining ratio between the image data before the noise reduction processing performed in the noise reduction processing step and the image data after the noise reduction processing on the basis of the gradation conversion characteristic; and a combining step for combining the image data before the noise reduction processing performed in the noise reduction processing step and the image data after the noise reduction processing on the basis of the combining ratio.

A third aspect of the present invention provides a computer-readable storage medium storing an image processing program that causes a computer to execute a gradation conversion processing step for performing gradation conversion processing on image data on the basis of a predetermined gradation conversion characteristic; a noise reduction processing step for performing noise reduction processing on the image data; a combining-ratio calculating step for calculating a combining ratio between the image data before the noise reduction processing performed in the noise reduction processing step and the image data after the noise reduction processing on the basis of the gradation conversion characteristic; and a combining step for combining the image data before the noise reduction processing performed in the noise reduction processing step and the image data after the noise reduction processing on the basis of the combining ratio.

BRIEF DESCRIPTION OF THE SEVERAL VIEWS OF THE DRAWINGS

FIG. 13 is a flow chart illustrating a procedure for calculating a combining ratio in a combining-ratio calculator of the image processing device according to the fourth embodiment of the present invention.

DETAILED DESCRIPTION OF THE INVENTION

Embodiments of an image processing device according to the present invention will be described below with reference to the drawings.

First Embodiment

Figure 1:
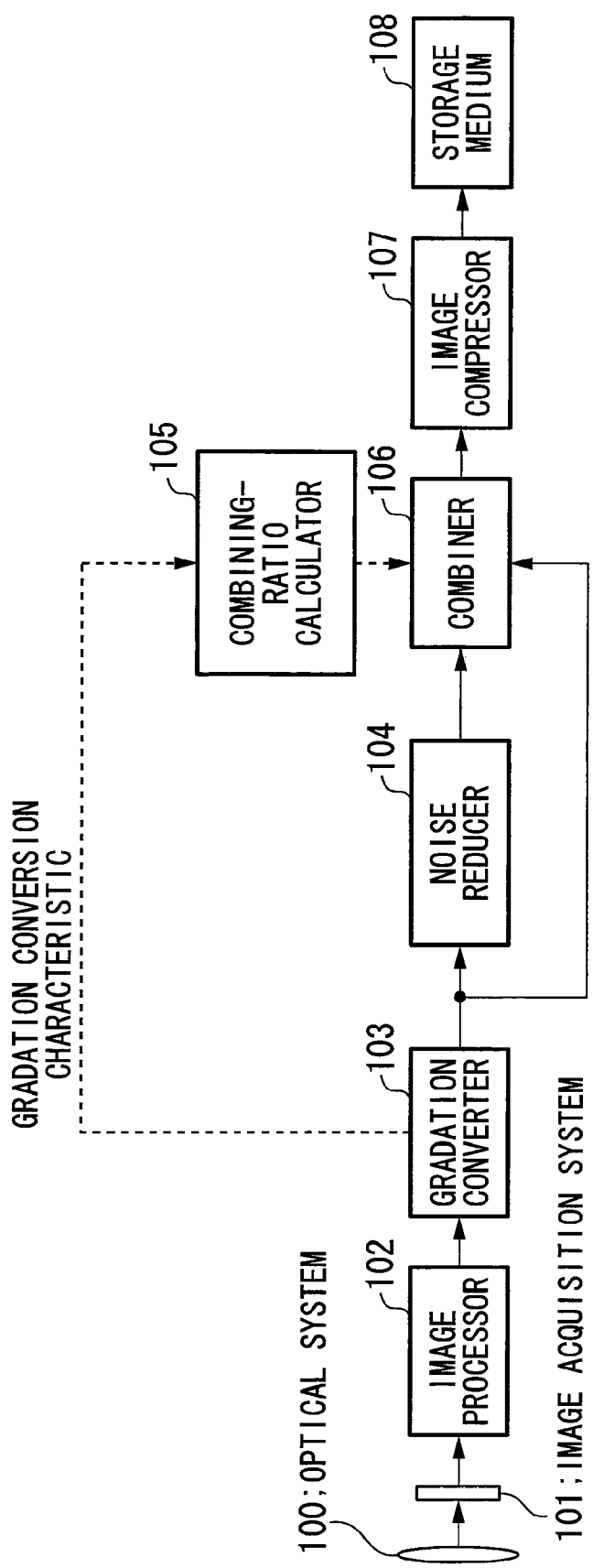
FIG. 1 is a block diagram schematically illustrating an image processing device according to a first embodiment of the present invention.

FIG. 1 is a block diagram illustrating the schematic configuration of an image processing device according to a first embodiment of the present invention. As shown in FIG. 1, the image processing device according to this embodiment includes an optical system 100, an image acquisition system 101, an image processor 102, a gradation converter (gradation conversion processor) 103, a noise reducer (noise reduction processor) 104, a combining-ratio calculator 105, a combiner 106, an image compressor 107, and a storage medium 108.

The optical system 100 is formed of a lens or the like, is configured to form an image of an object, and is disposed so as to form the image on the image acquisition system 101. The image acquisition system 101 includes a solid-state image acquisition device, such as a CCD, and uses the solid-state image acquisition device to perform photoelectric conversion of the optical image of the object formed by the optical system 100 so as to output electrical image data, and also performs adjustment of correlated-double-sampling (CDS)/differential-sampling and analog gain. The image processor 102 performs various kinds of processing, such as white-balance processing and optical-black (OB) subtraction processing, on the image data and outputs the processed image data to the gradation converter 103.

The gradation converter 103 performs gradation conversion processing on the image data. The gradation converter 103 is preliminarily provided with a function related to a gradation conversion characteristic as well as data set in a look-up table or the like, and calculates a gradation conversion characteristic in target pixels to be processed on the basis of this data.

Figure 2:
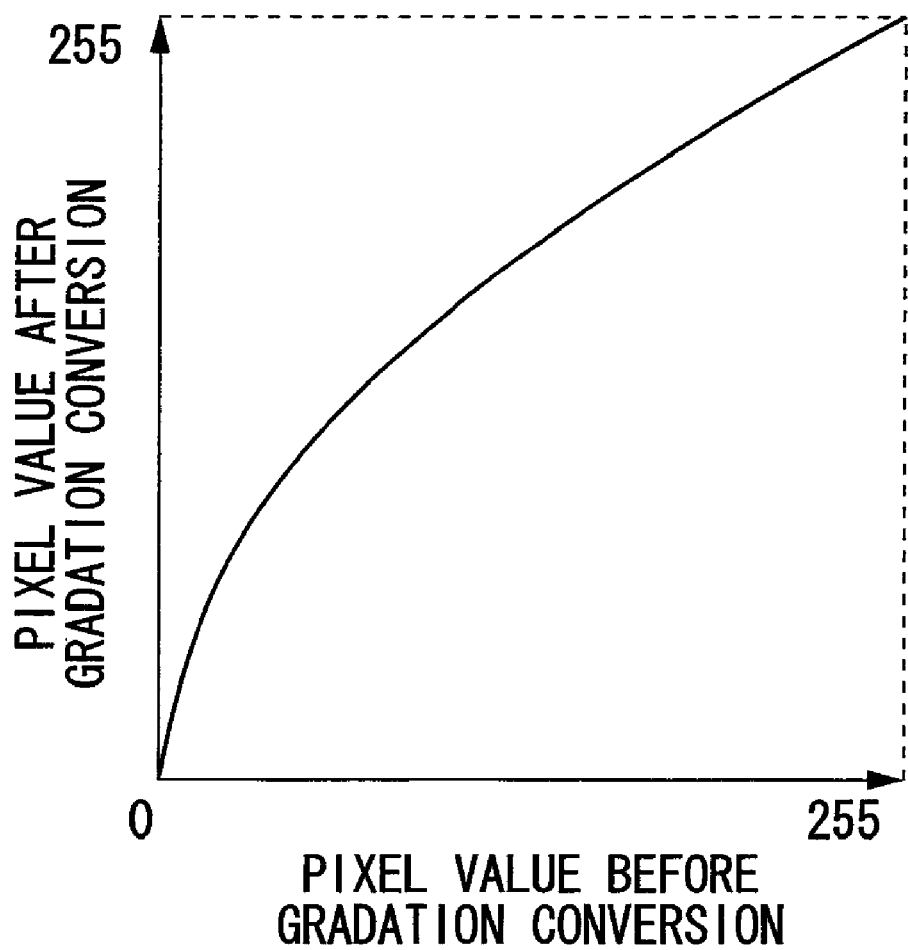
FIG. 2 is a characteristic diagram illustrating an example of a gradation conversion characteristic when performing gradation conversion processing in a gradation converter of the image processing device according to the first embodiment of the present invention.

If the gradation conversion processing performed in the gradation converter 103 is, for example, so-called space-invariant gradation conversion processing in which the gradation conversion processing is performed on the entire image on the basis of a single gradation conversion characteristic in the image scene, a space-invariant gradation conversion characteristic diagram shown in FIG. 2 is set, and the gradation conversion processing is performed on the image data on the basis of this gradation conversion characteristic. In this case, the space-invariant gradation conversion characteristic indicates an amplification factor of each pixel value and is obtained by dividing a pixel value of an image before performing the space-invariant gradation conversion processing thereon by a pixel value of the image after performing the space-invariant gradation conversion processing thereon.

Similarly, if the gradation conversion processing performed in the gradation converter 103 is, for example, so-called space-variant gradation conversion processing in which the processing is performed by changing the gradation conversion characteristic for individual areas of the image scene so as to expand the dynamic range of the image scene, a look-up table, a function, or a characteristic diagram related to a corresponding gradation conversion characteristic are provided, although not shown in the drawings, and the gradation conversion processing is performed on the image data on the basis of this gradation conversion characteristic.

Such a gradation conversion characteristic may be preliminarily set as a freely-chosen characteristic in the form of a function or a look-up table, as mentioned above, or may be calculated from the image by performing histogram equalization or the like.

The noise reducer 104 is configured to perform noise reduction processing on the gradation-converted image data, and a default value indicating the magnitude of noise reduction is set in the noise reducer 104.

The combining-ratio calculator 105 calculates a combining ratio between pre-noise-reduction image data and post-noise-reduction image data on the basis of the gradation conversion characteristic used in the gradation converter 103. In more detail, the combining ratio between the pre-noise-reduction image data and the post-noise-reduction image data is calculated for each pixel on the basis of an amplification factor corresponding to each pixel.

The combiner 106 combines the pre-noise-reduction image data and the post-noise-reduction image data on the basis of the combining ratio input from the combining-ratio calculator 105. The aforementioned processing is performed on every pixel of the image, and when the processing is completed for all of the pixels, that is, when the combining processing is completed for all of the pixels, combined image data is output.

The combined image data undergoes predetermined image processing in a processor (not shown) and is subsequently transmitted to the storage medium 108 via the image compressor 107 and the like. The aforementioned processing is performed by the operation of each processor under the control of a system controller (not shown).

Next, an image processing method performed by the image processing device having the above-described configuration will be described with reference to the drawings.

When an image of an object is photographed via the optical system 100, the image acquisition system 101 converts the image of the object to image data, and an A/D converter (not shown) converts the output image data to image data of a discretized digital signal on which predetermined processing can be performed in the image processor 102, and outputs the image data to the image processor 102. The image processor 102 performs the predetermined processing, such as white balance processing and OB subtraction processing, on the input image data and outputs the image data to the gradation converter 103.

Figure 3:
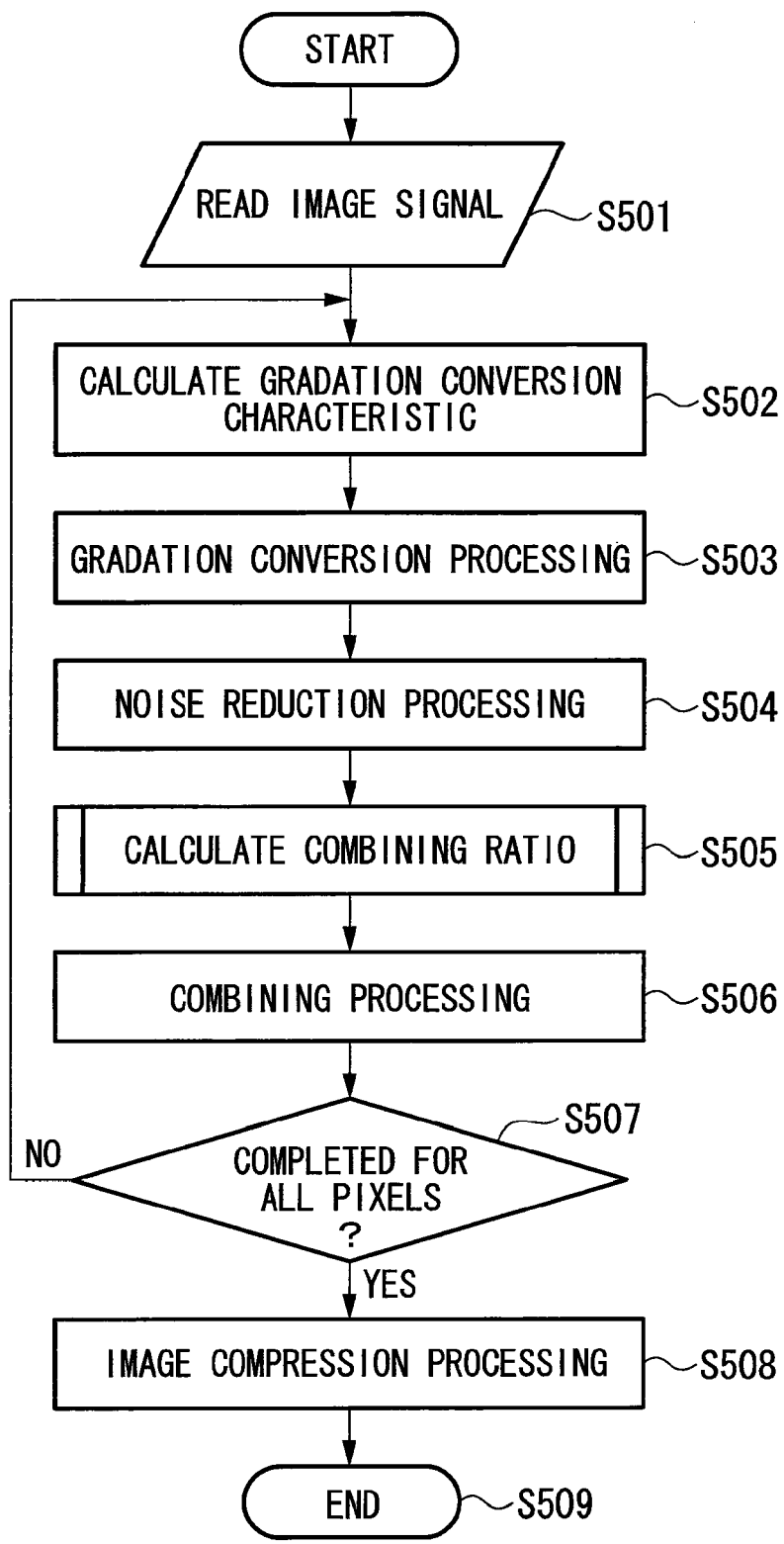
FIG. 3 is a flow chart illustrating a procedure from gradation conversion processing to image combining processing performed in the image processing device according to the first embodiment of the present invention.

FIG. 3 is a flow chart illustrating a procedure from gradation conversion processing performed by the gradation converter 103 to image combining processing. In step S501, the gradation converter 103 reads the image data output from the image processor 102. In step S502, a gradation conversion characteristic in the target pixels to be processed is calculated from the gradation conversion characteristic preliminarily set in the gradation converter 103. In step S503, gradation conversion processing is performed on the image data on the basis of the gradation conversion characteristic calculated in step S502, and the gradation-converted image data is output to the combiner 106 and the noise reducer 104.

In step S504, the noise reducer 104 performs noise reduction processing on the input image data on the basis of the preliminarily set default value indicating the magnitude of noise reduction. The noise-reduced image data is output to the combiner 106.

In step S505, the combining-ratio calculator 105 calculates a combining ratio between the pre-noise-reduction image data and the post-noise-reduction image data for each corresponding pixel. Specifically, a combining ratio between the pre-noise-reduction image data and the post-noise-reduction image data is calculated for each corresponding pixel on the basis of the gradation conversion characteristic calculated in step S502, that is, on the basis of an amplification factor.

In more detail, for example, supposing that, of a combining ratio preliminarily set as a freely-chosen constant value, a proportion at which pre-noise-reduction image data is to be combined is denoted by Morg, a proportion at which post-noise-reduction image data is to be combined is denoted by Mnr, an amount of change in the combining ratio is denoted by B, and the gradation conversion characteristic (amplification factor) at a freely-chosen pixel position [I, j] is denoted by G[I, j], then a proportion M'org[I, j] at which the pre-noise-reduction image is to be combined and a proportion M'nr[I, j] at which the post-noise-reduction image is to be combined, which make up the combining ratio corresponding to the aforementioned pixel position, can be expressed with the following equations.

$$M'org[I,j]=Morg-B*(G[I,j]-1)$$

$$M'nr[I,j]=Mnr+B*(G[I,j]-1)$$

When Morg=0.4, Mnr=0.6, B=0.5, and G[I, j]=1.2 as specific numerical values, M'org[I, j] and M'nr[I, j] are calculated as follows:

$$M'org[I,j]=0.4-0.5*(1.2-1)=0.3$$

$$M'nr[I,j]=0.6+0.5*(1.2-1)=0.7$$

In this case, the amount of change B in the combining ratio is a preliminarily set value and can be set in a freely-chosen manner. The calculated combining ratio is output to the combiner 106.

In step S506, the combiner 106 combines the pre-noise-reduction image data and the post-noise-reduction image data on the basis of the combining ratio input from the combining-ratio calculator 105. In detail, the combining processing is performed as follows using M'org[I, j] and M'nr[I, j]:

$$S'[I, j]=M'org[I, j]*Sorg[I, j]+M'nr[I, j]*Snr[I, j]$$ where Sorg[I, j] denotes a value of the pre-noise-reduction image at the freely-chosen pixel position [I, j], Snr[I, j] denotes a value of the post-noise-reduction image, and S'[I, j] denotes a value of the combined image.

In step S507, it is determined whether or not the processing up to step S506 has been performed on all of the pixels in the image data. When it is determined that the processing has been completed for all of the pixels, the combined data undergoes predetermined image processing in a processor (not shown) and is subsequently output to the image compressor 107 so as to undergo compression processing in step S508.

The above-described processing is performed by the operation of each processor under the control of the system controller (not shown).

Since the pre-noise-reduction image and the post-noise-reduction image are combined in this manner using the combining ratio calculated on the basis of the gradation conversion characteristic, the post-noise-reduction image can be combined at a large proportion and the pre-noise-reduction image can be combined at a small proportion in areas where noise is amplified as a result of gradation conversion processing, whereby an image with effectively reduced noise can be obtained. Moreover, since the pre-noise-reduction image and the post-noise-reduction image are combined at a ratio suitable for each area of the image, image sharpness can be maintained. In the case where space variant gradation conversion processing is performed, noise can be effectively reduced, and the dynamic range of the image scene can be expanded while maintaining the sharpness thereof.

Second Embodiment

Figure 4:
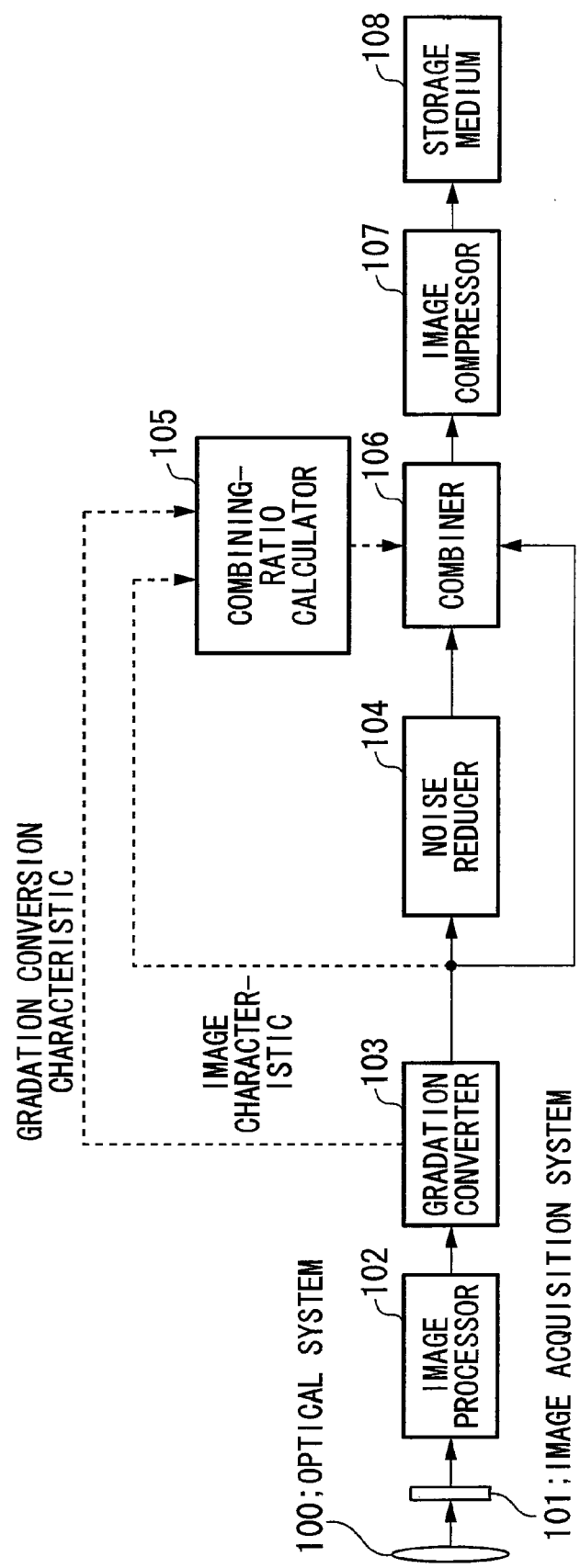
FIG. 4 is a block diagram schematically illustrating an image processing device according to a second embodiment of the present invention.

Next, a second embodiment of the present invention will be described. FIG. 4 is a block diagram illustrating the schematic configuration of an image processing device according to this embodiment. Since the basic configuration of the image processing device according to this embodiment is similar to that of the image processing device according to the first embodiment, the descriptions of similar components will be omitted, and only the differences will be described below.

This embodiment is characterized in that the combining-ratio calculator 105 calculates image characteristics from image data having undergone gradation conversion processing performed by the gradation converter 103, and calculates a combining ratio on the basis of the image characteristics and the gradation conversion characteristic. Specifically, as shown in FIG. 4 with dotted lines, the gradation converter 103 performs gradation conversion processing on image data and subsequently outputs the image data to the combining-ratio calculator 105 and the combiner 106. The combining-ratio calculator 105 calculates image characteristics, including brightness information, edge information, and color information, from the gradation-converted image data.

A method of calculating the brightness information, the edge information, and the color information will be described below. In this embodiment, as shown in FIG. 5, a brightness value converted from a pixel value of a target position to be processed is expressed as p[i, j], and a method of calculating information for a 3-by-3 pixel region with p[i, j] in the center will be described below.

Brightness information Y[i, j] is calculated from an average value of the 3-by-3 pixel region so as to reduce the effect of noise.

$$Y[i,j]=(p[i-1,j-1]+p[i,j-1]+p[i+1,j-1]+p[i-1,j]+\\p[i,j]+p[i+1,j]+p[i-1,j+1]+p[i,j+1]+p[i+1,j+1])/9$$

Figures 5, 6:
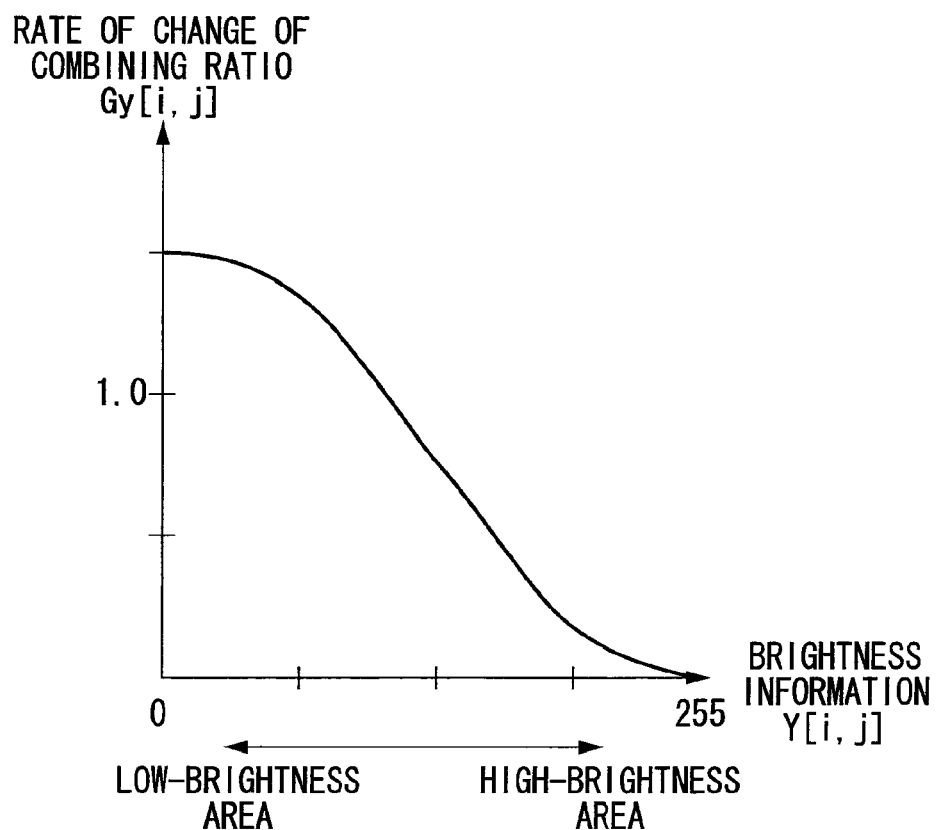
FIG. 5 illustrates an example of a target pixel to be processed and a 3-by-3 pixel region with the target pixel in the center.
FIG. 6 illustrates the relationship between brightness information and a rate of change of combining ratio.

Next, a rate of change of combining ratio Gy[i, j] is calculated from the brightness information Y[i, j] and a freely-chosen characteristic Fy, as shown in FIG. 6. The rate of change of combining ratio is a value used for taking into account not only the gradation conversion characteristic but also the brightness information and the edge information when calculating the ratio between images to be combined. As described below, a rate of change of combining ratio Gy[i, j] dependent on brightness information, a rate of change of combining ratio Ge[i, j] dependent on edge information, and a rate of change of combining ratio Gc[i,j] dependent on color information are calculated. The freely-chosen characteristic Fy is a characteristic that makes Gy[i, j] large in a low-brightness area where noise is noticeable but makes Gy[i, j] small in a high-brightness area where noise is not noticeable.

$$Gy[i,j]=Fy(Y[i,j])$$

Edge information E[i, j] is calculated using the following equations:

$$Dh=(|p[i-1,j]-p[i,j]|+|p[i+1,j]-p[i,j]|)/2$$

$$Dv=(|p[i,j-1]-p[i,j]|+|p[i,j+1]-p[i,j]|)/2$$

$$Dz=(|p[i+1,j-1]-p[i,j]|+|p[i-1,j+1]-p[i,j]|)/2$$

$$Dn=(|p[i-1,j-1]-p[i,j]|+|p[i+1,j+1]-p[i,j]|)/2$$

where Dh, Dv, Dz, and Dn respectively denote edge amounts in the horizontal direction, the vertical direction, the upper-right diagonal direction, and the lower-right diagonal direction.

A maximum value of Dh, Dv, Dz, and Dn is set as the edge information E[i, j]. Edge information with a large value indicates that the difference between the target position to be processed and the adjacent pixels is large, meaning that the target position belongs to an edge area. In contrast, edge information with a small value indicates that the difference between the target position to be processed and the adjacent pixels is small, meaning that the target position belongs to a non-edge area.

Figure 7:
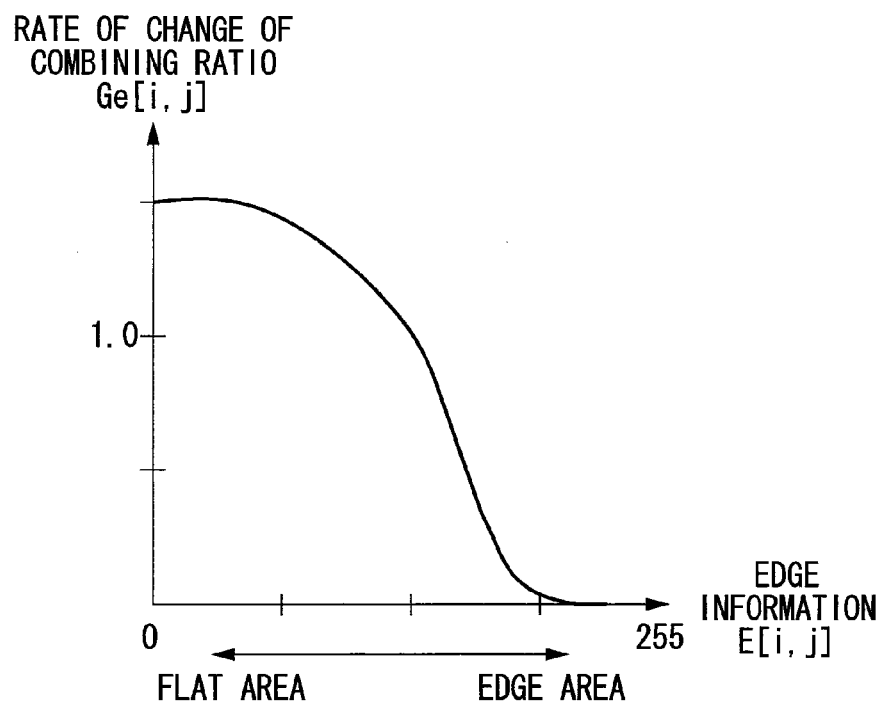
FIG. 7 illustrates the relationship between edge information and the rate of change of combining ratio.

As shown in FIG. 7, a rate of change of combining ratio Ge[i, j] is calculated from this edge information E[i, j] and a freely-chosen characteristic Fe. The freely-chosen characteristic Fe is a characteristic that makes Ge[i, j] large in a flat area where noise is preferably eliminated but makes Ge[i, j] small in an edge area where sharpness is preferably maintained.

$$Ge[i,j]=Fe(E[i,j])$$

Figure 8:
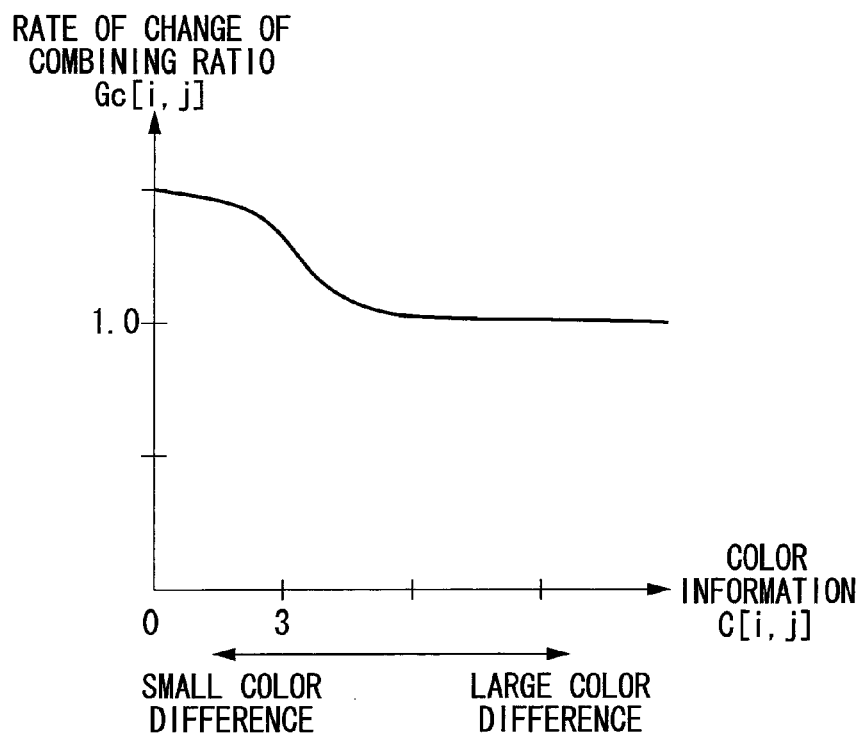
FIG. 8 illustrates the relationship between color information and the rate of change of combining ratio.

If color information corresponds to, for example, a freely-chosen area where RGB values of a pixel at a freely-chosen pixel position are converted to L*a*b* values, the pixel position is determined as belonging to a specific color area, and a color difference between the aforementioned L*a*b* values and L*a*b* values of a specific color is set as color information C[i, j]. The specific color is a color that preferably makes noise unnoticeable, such as the color of human skin or the color of the sky. As shown in FIG. 8, a rate of change of combining ratio Gc[i, j] is calculated from this color information C[i, j] and a freely-chosen characteristic Fc. The freely-chosen characteristic Fc is a characteristic that makes Gc[i,j] large in a specific color area where noise is noticeable but makes Gc[i, j] small in other areas.

$$Gc[i,j]=Fc(C[i,j])$$

The combining-ratio calculator 105 calculates a combining ratio corresponding to each pixel of an image from the gradation conversion characteristic (amplification factor) corresponding to the pixel and the aforementioned image characteristics. For example, supposing that, of a combining ratio preliminarily set as a freely-chosen constant value, a proportion at which pre-noise-reduction image data is to be combined is denoted by Morg, a proportion at which post-noise-reduction image data is to be combined is denoted by Mnr, and an amount of change in the combining ratio is denoted by B, then a proportion M'org[I, j] at which the pre-noise-reduction image is to be combined and a proportion M'nr[I, j] at which the post-noise-reduction image is to be combined, which make up the combining ratio corresponding to a freely-chosen pixel position [i, j], can be expressed with the following equations:

$$M'org[i,j]=Morg-B*(G[i,j]*Gy[i,j]*Ge[i,j]*Gc[i,j]-1)$$

$$M'nr[i,j]=Mnr+B*(G[i,j]*Gy[i,j]*Ge[i,j]*Gc[i,j]-1)$$

where G[i, j] denotes the gradation conversion characteristic (amplification factor) at the aforementioned freely-chosen pixel position [i, j], Gy[i, j] denotes the rate of change of combining ratio dependent on brightness information, Ge[i, j] denotes the rate of change of combining ratio dependent on edge information, and Gc[i, j] denotes the rate of change of combining ratio dependent on color information.

When Morg=0.4, Mnr=0.6, B=0.5, G[i, j]=1.2, Gy[i, j]=1.1, Ge[i, j]=1.1, and Gc[i, j]=1.1 as specific numerical values, M'org[i, j] and M'nr[i, j] are calculated as follows:

$$M'org[i,j]=0.4-0.5*(1.2*1.1*1.1*1.1-1)=0.1$$

$$M'nr[i,j]=0.6+0.5*(1.2*1.1*1.1*1.1-1)=0.9$$

In this case, the amount of change B in the combining ratio is a preliminarily set value and can be set in a freely-chosen manner.

The combiner 106 performs combining processing as follows using M'org[i, j] and M'nr[i, j]:

$$S'[i,j]=M'org[i,j]*Sorg[i,j]+M'nr[i,j]*Snr[i,j]$$

where Sorg[i, j] denotes a value of the pre-noise-reduction image at the freely-chosen pixel position [i, j], Snr[i, j] denotes a value of the post-noise-reduction image, and S'[i, j] denotes a value of the combined image.

The combined image is output after the aforementioned processing is performed at all of the pixel positions in the image. In this embodiment, although three kinds of information, including brightness information, edge information, and color information, are used as the image characteristics, the image characteristics are not limited to these three kinds and may be of any kind so long as the information can be used for differentiating between the image and noise. Furthermore, although the image characteristics are calculated from the image data after performing gradation conversion processing thereon, the image characteristics do not necessarily need to be calculated after the gradation conversion processing and may be calculated from appropriate image data before performing gradation conversion processing thereon or after performing noise reduction processing thereon.

Accordingly, since the pre-noise-reduction image and the post-noise-reduction image are combined using the combining ratio calculated on the basis of the gradation conversion characteristic and the image characteristics in this embodiment, the post-noise-reduction image can be combined at a large proportion and the pre-noise-reduction image can be combined at a small proportion in areas where noise is amplified as a result of gradation conversion processing, whereby an image with effectively reduced noise can be obtained. Moreover, since the pre-noise-reduction image and the post-noise-reduction image are combined at a ratio suitable for each area of the image, image sharpness can be maintained.

Furthermore, since the combining ratio is controlled in accordance with the image characteristics, appropriate processing can be adaptively performed on areas where noise is preferably reduced intensively and areas where sharpness is preferably maintained.

Third Embodiment

Next, a third embodiment of the present invention will be described.

Figure 9:
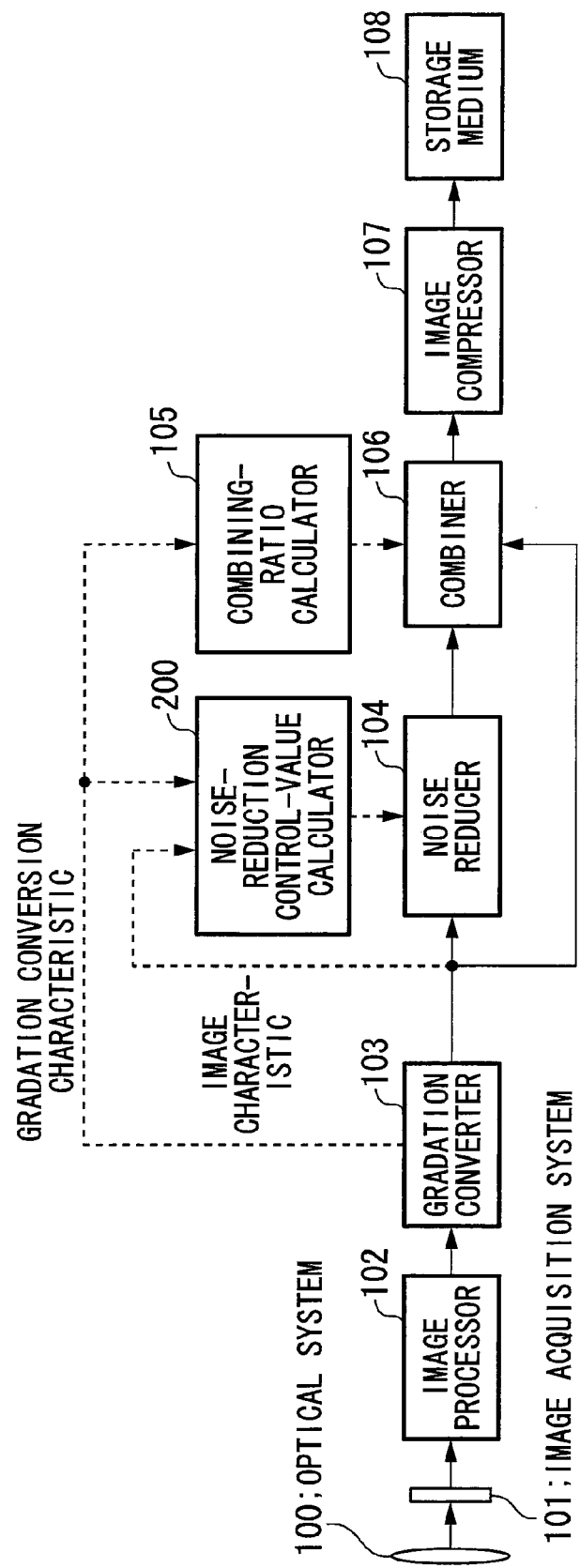
FIG. 9 is a block diagram schematically illustrating an image processing device according to a third embodiment of the present invention.

FIG. 9 is a block diagram illustrating the schematic configuration of an image processing device according to this embodiment. Since the basic configuration of the image processing device according to this embodiment is similar to that of the image processing device according to the first embodiment, the descriptions of similar components will be omitted, and only the differences will be described below.

As an addition to the configuration of the above-described embodiments, this embodiment is provided with a noise-reduction control-value calculator 200 that calculates a noise-reduction control value used for appropriately changing the magnitude of noise reduction at pixel positions on the basis of the gradation conversion characteristic and the image characteristics.

The noise-reduction control-value calculator 200 calculates an amount of change in the magnitude of noise reduction (noise-reduction control value) corresponding to each pixel of an image on the basis of the gradation conversion characteristic (amplification factor) corresponding to the pixel and the image characteristics, including brightness information, edge information, and color information. A noise-reduction control value Gnr[i, j] corresponding to a freely-chosen pixel position [i, j] can be expressed with the following equation:

$$Gnr[i,j] = G[i,j]*Gy[i,j]*Ge[i,j]*Gc[i,j]$$

where G[i, j] denotes the gradation conversion characteristic (amplification factor) at the freely-chosen pixel position [i, j], Gy[i, j] denotes the rate of change of combining ratio dependent on brightness information, Ge[i, j] denotes the rate of change of combining ratio dependent on edge information, and Gc[i, j] denotes the rate of change of combining ratio dependent on color information.

The noise reducer 104 performs noise reduction processing on a gradation-converted image in a manner such that the magnitude of noise reduction is changeable. The following is a description in which coring processing is used as an example of noise reduction processing. Supposing that a pixel value of a freely-chosen pixel position [i, j] in an image is denoted by S[i, j] and an average value of a freely-chosen region surrounding the pixel position is denoted by Save, when coring processing is performed in which a signal with a value smaller than or equal to a threshold value Th[i, j] of the freely-chosen pixel position is made equal to zero by an absolute value |S[i, j]−Save| of the difference between the pixel value S[i, j] and the average value Save, the magnitude of noise reduction is controlled by multiplying the threshold value Th[i, j] by the noise-reduction control value Gnr[i, j]. If a pixel value obtained after performing the coring processing is denoted by S'[i, j], the pixel value S'[i, j] can be expressed as follows.

When |S[i, j]−Save|<Th[i, j]*Gnr[i, j],
S'[i, j]=Save
When |S[i, j]−Save|≧Th[i, j]*Gnr[i, j],
S'[i, j]=S[i, j]−Th[i, j]*Gnr[i, j], if S[i, j]−Save>0, or
S'[i, j]=S[i, j]+Th[i, j]*Gnr[i, j], if S[i, j]−Save<0

Although coring processing is used as noise reduction processing in this case, noise reduction processing in which the magnitude of noise reduction is changed by changing the filter factor or the number of taps of the filter may be used as an alternative.

After performing the noise reduction processing in the above-described manner, the noise-reduced image data is output to the combiner 106.

As in the first embodiment, the combining-ratio calculator 105 calculates a combining ratio between the pre-noise-reduction image data and the post-noise-reduction image data on the basis of the gradation conversion characteristic in the gradation converter 103. The combiner 106 combines the pre-noise-reduction image data and the post-noise-reduction image data on the basis of the previously calculated combining ratio. When the combining processing is completed for all of the pixels in the image data, the combined image data is output to the image compressor 107.

Accordingly, since the pre-noise-reduction image and the post-noise-reduction image are combined using the combining ratio calculated on the basis of the gradation conversion characteristic in this embodiment, the post-noise-reduction image can be combined at a large proportion and the pre-noise-reduction image can be combined at a small proportion in areas where noise is amplified as a result of gradation conversion processing, whereby an image with effectively reduced noise can be obtained. Moreover, since the magnitude of noise reduction is controlled by using the noise-reduction control value calculated on the basis of the gradation conversion characteristic and the image characteristics, noise reduction processing can be performed with the magnitude suitable for each area of the image, whereby a noise-reduced image having undergone appropriate processing performed adaptively on areas where noise is preferably reduced intensively and areas where sharpness is preferably maintained can be obtained.

Fourth Embodiment

Next, a fourth embodiment of the present invention will be described.

Figure 10:
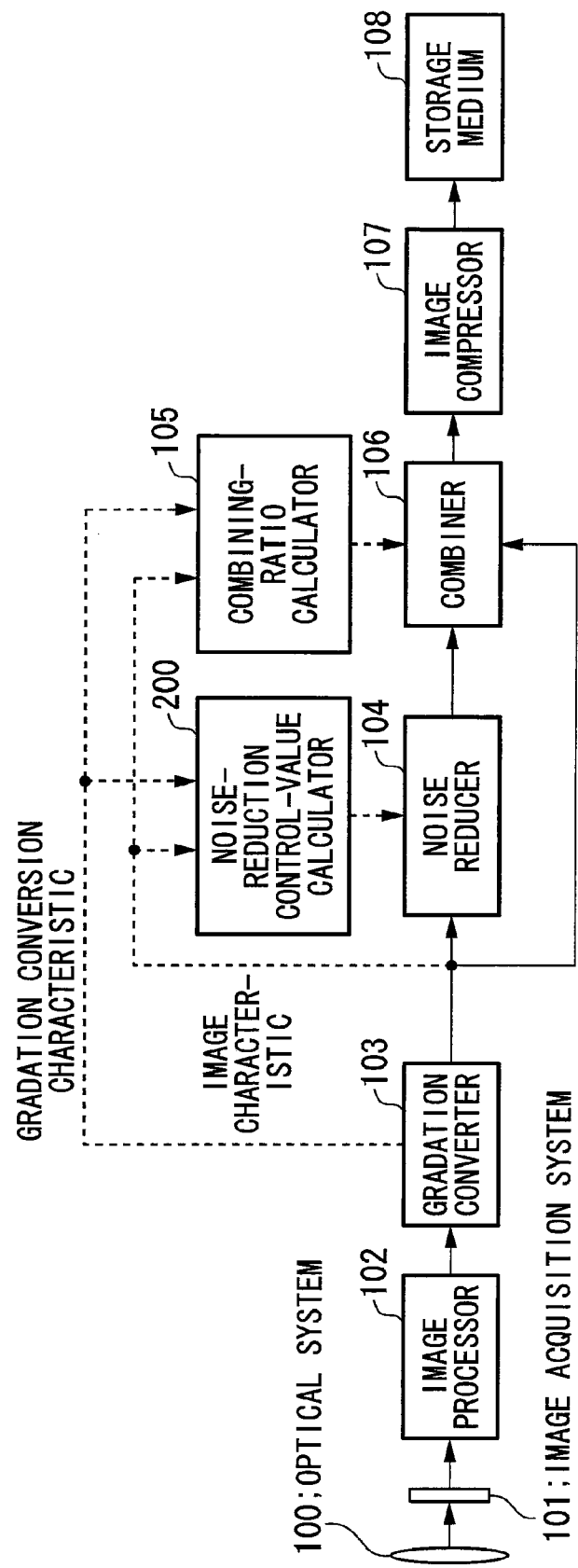
FIG. 10 is a block diagram schematically illustrating an image processing device according to a fourth embodiment of the present invention.

FIG. 10 is a block diagram illustrating the schematic configuration of an image processing device according to this embodiment. Since the basic configuration of the image processing device according to this embodiment is similar to that of the image processing device according to the third embodiment, the descriptions of similar components will be omitted, and only the differences will be described below.

This embodiment differs from the third embodiment described above in that the combining ratio is set on the basis of both the gradation conversion characteristic and the image characteristics. Therefore, as shown in FIG. 10, image data having undergone gradation conversion processing in the gradation converter 103 is output to the noise reducer 104, the combining-ratio calculator 105, and the noise-reduction control-value calculator 200. Then, the image characteristics of this image data are used in the combining-ratio calculator 105 and the noise-reduction control-value calculator 200.

An image processing method performed by the image processing device according to this embodiment will be described below. When an image of an object is photographed via the optical system 100, the image acquisition system 101 converts the image of the object to image data, and the A/D converter (not shown) converts the output image data to image data of a discretized digital signal on which predetermined processing can be performed in the image processor 102, and outputs the image data to the image processor 102.

The image processor 102 performs the predetermined processing, such as white balance processing and OB subtraction processing, on the input image data and outputs the image data to the gradation converter 103.

Figure 11:
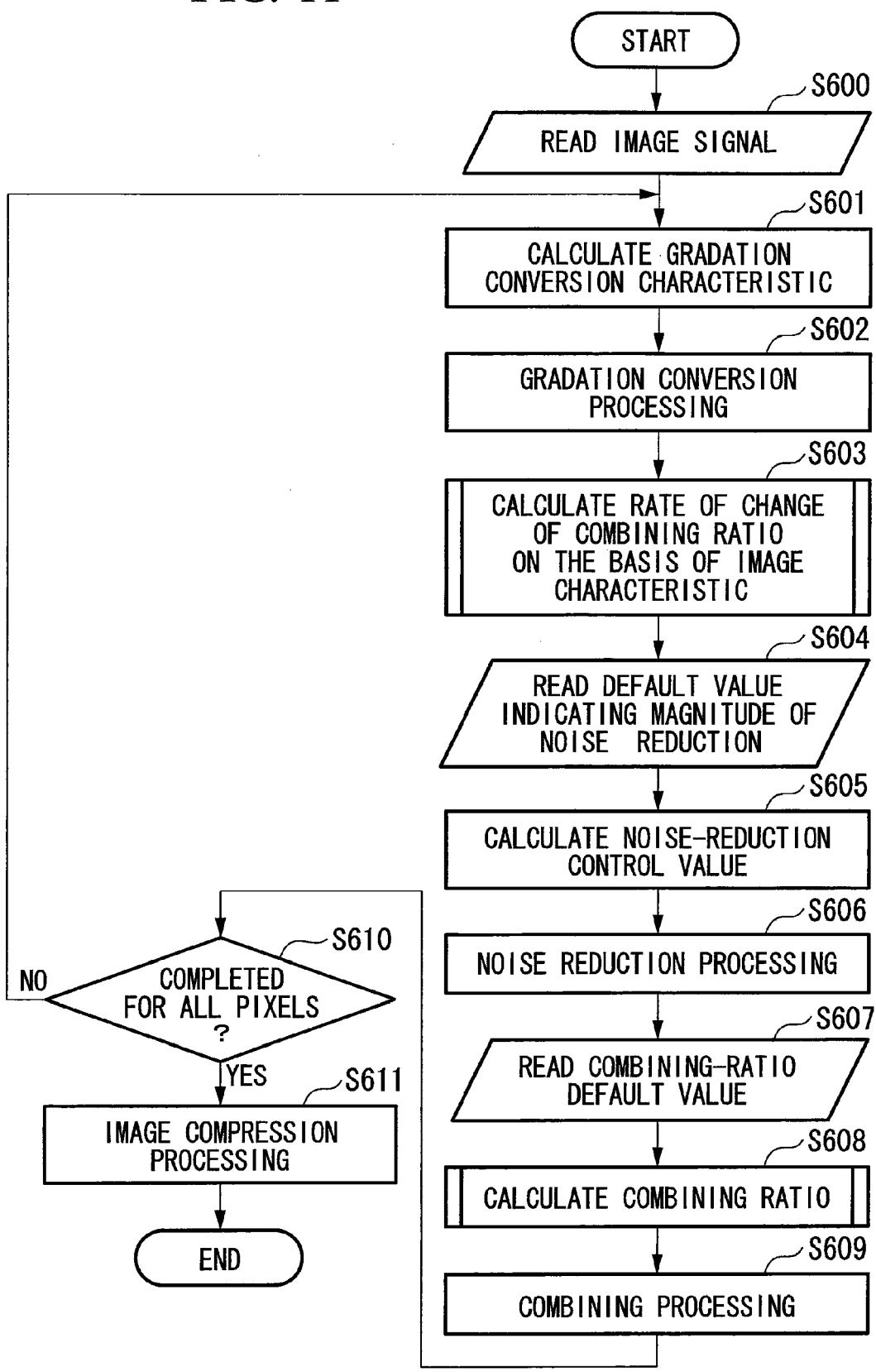
FIG. 11 is a flow chart illustrating a procedure from gradation conversion processing to image combining processing performed in the image processing device according to the fourth embodiment of the present invention.

FIG. 11 is a flow chart illustrating a procedure from gradation conversion processing performed by the gradation converter 103 to image combining processing.

In step S600, the gradation converter 103 reads the image data received from the image processor 102. In step S601, a gradation conversion characteristic is calculated on the basis of the read image data and a characteristic diagram of the gradation conversion characteristic, as shown in FIG. 2, preliminarily set in the gradation converter 103. In step S602, gradation conversion processing is performed on the image data on the basis of the gradation conversion characteristic calculated in step S601. In step S603, a rate of change of combining ratio is calculated using at least one kind of information out of three kinds of image characteristics (i.e., brightness information, edge information, and color information) included in the image data having undergone the gradation conversion processing in step S602.

Figure 12A:
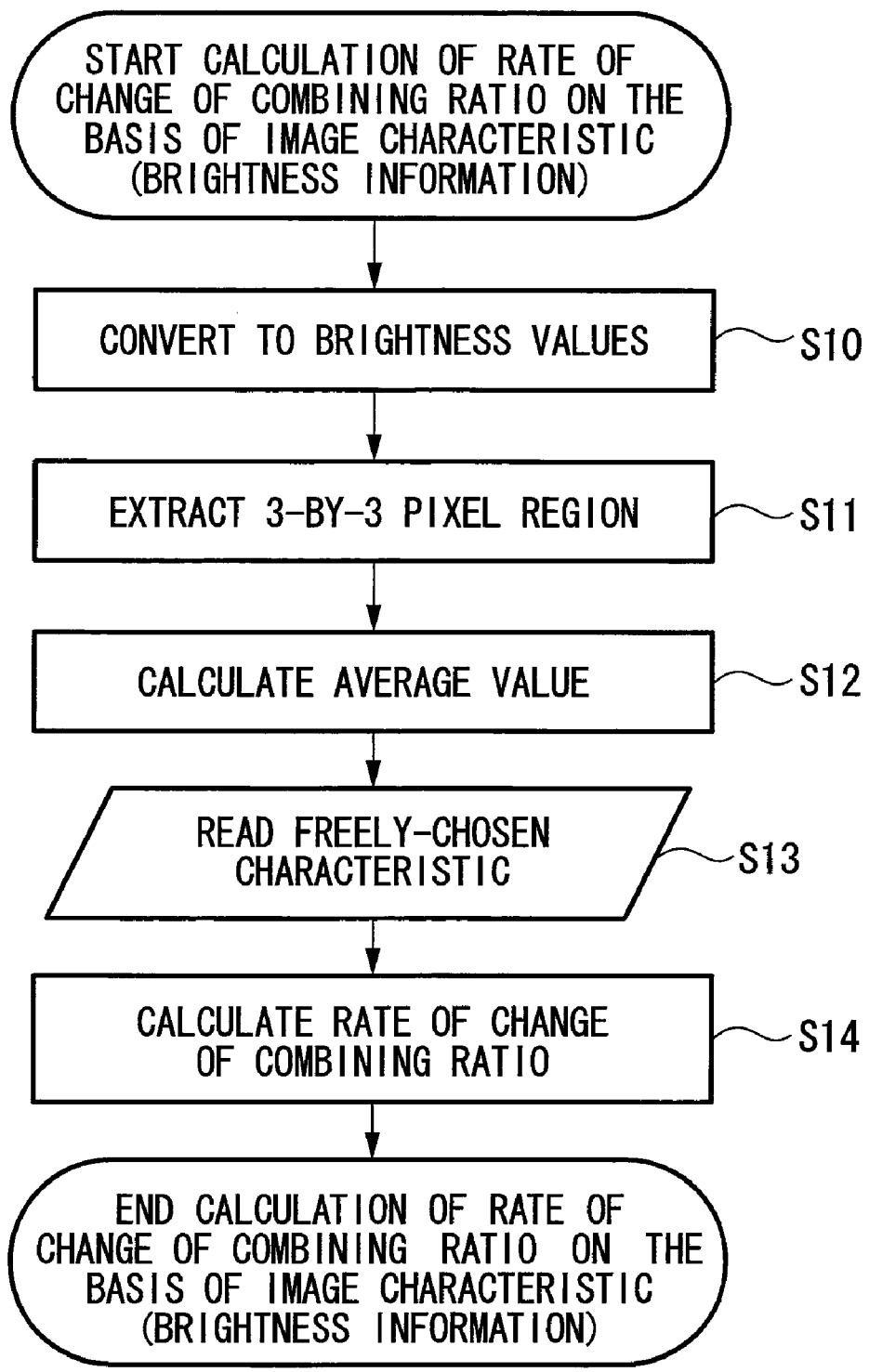
FIG. 12A is a flow chart illustrating a procedure for calculating the rate of change of combining ratio from the brightness information in the image processing device according to the fourth embodiment of the present invention.

As shown in FIG. 12A, when calculating the rate of change of combining ratio from the brightness information, a brightness value is calculated in step S10 from the image data having undergone the gradation conversion processing in step S602, and then a 3-by-3 pixel region with a target pixel position to be processed in the center is extracted in step S11. Subsequently, in step S12, an average value of the brightness values in the 3-by-3 pixel region extracted in step S11 is calculated. In step S13, a freely-chosen characteristic Fy used for converting the average value calculated in step S12 to a rate of change of combining ratio is read. In step S14, a rate of change of combining ratio Gy is calculated from the average value calculated in step S12 and the freely-chosen characteristic Fy read in step S13.

Figure 12B:
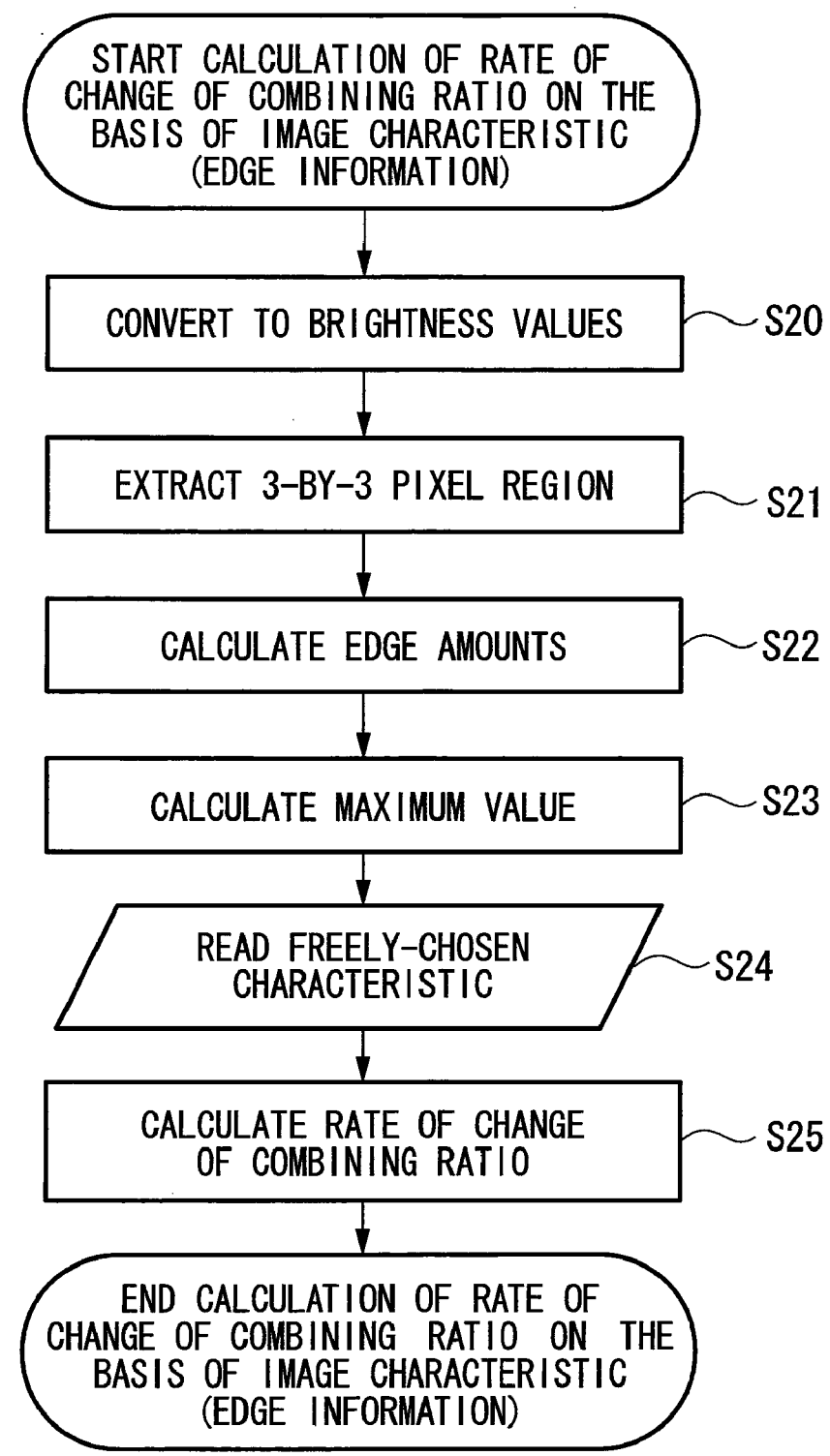
FIG. 12B is a flow chart illustrating a procedure for calculating the rate of change of combining ratio from the edge information in the image processing device according to the fourth embodiment of the present invention.
Figure 12:
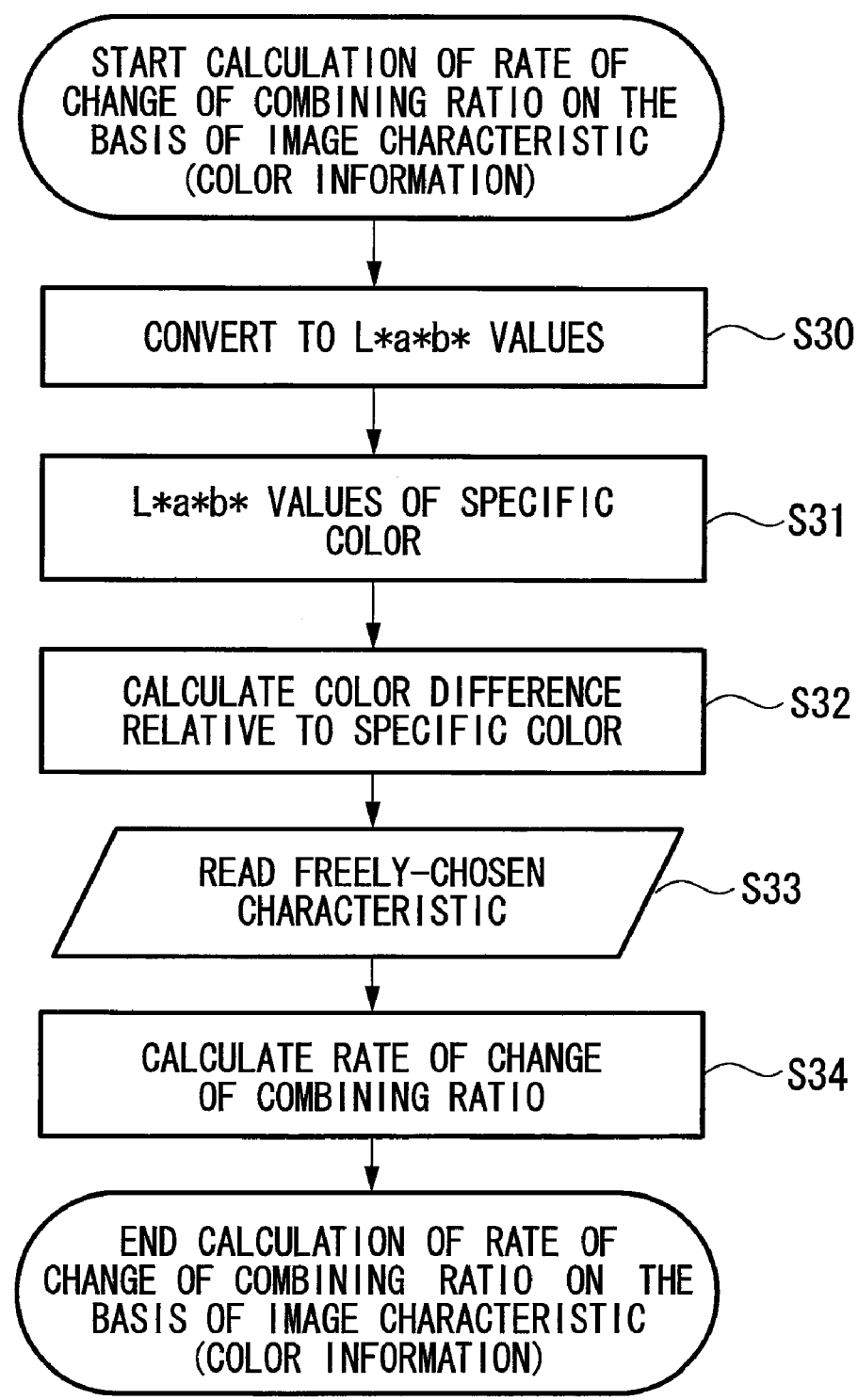
FIG. 12C is a flow chart illustrating a procedure for calculating the rate of change of combining ratio from the color information in the image processing device according to the fourth embodiment of the present invention.

As shown in FIG. 12B, when calculating the rate of change of combining ratio from another image characteristic (edge information), a brightness value is calculated in step S20 from the image data having undergone the gradation conversion processing in step S602. In step S21, a 3-by-3 pixel region with a target pixel position to be processed in the center is extracted. In step S22, edge amounts in the horizontal direction, the vertical direction, the upper-right diagonal direction, and the lower-right diagonal direction are calculated from the 3-by-3 pixel region extracted in step S21. In step S23, a maximum value is calculated from the four edge amounts calculated in step S22. In step S24, a freely-chosen characteristic Fe used for converting the maximum value calculated in step S23 to a rate of change of combining ratio is read. In step S25, a rate of change of combining ratio Ge is calculated from the maximum value calculated in step S23 and the freely-chosen characteristic read in step S24.

As shown in FIG. 12C, when calculating the rate of change of combining ratio from another image characteristic (color information), L*a*b* values are calculated in step S30 from the image data having undergone the gradation conversion processing in step S602. In step S31, L*a*b* values of a specific color are read. In step S32, a color difference is calculated from the L*a*b* values converted in step S30 and the L*a*b* values of the specific color read in step S31. In step S33, a freely-chosen characteristic Fc used for converting the color difference calculated in step S32 to a rate of change of combining ratio is read. In step S34, a rate of change of combining ratio Gc is calculated from the color difference calculated in step S32 and the freely-chosen characteristic read in step S33.

In step S604, a default value indicating the magnitude of noise reduction preliminarily set in the noise reducer 104 is read. In step S605, the noise-reduction control-value calculator 200 calculates a noise-reduction control value. In detail, the noise-reduction control value is calculated by multiplying the gradation conversion characteristic calculated in step S601 by the rate of change of combining ratio calculated in step S603 and the default value indicating the magnitude of noise reduction read in step S604.

In step S606, noise reduction processing is performed on the image data having undergone the gradation conversion processing in step S602 on the basis of the noise-reduction control value calculated in step S605. The noise-reduced image data is output to the combiner 106. Subsequently, in step S607, the combining-ratio calculator 105 reads a combining-ratio default value. In step S608, the combining-ratio calculator 105 calculates a combining ratio.

In detail, as shown in a flow chart in FIG. 13, an amount of change in the combining ratio is read in step S40. In step S41, the rate of change of combining ratio calculated in step S603 is multiplied by the amount of change in the combining ratio read in step S40. In step S42, the product obtained as the result of multiplication in step S41 is added to a proportion at which the post-noise-reduction image is to be combined out of the combining-ratio default value read in step S607. In step S43, the product obtained as the result of multiplication in step S41 is subtracted from a proportion at which the pre-noise-reduction image to be combined out of the combining-ratio default value read in step S607.

In step S609, the post-noise-reduction image data having undergone the noise reduction processing in step S606 and the pre-noise-reduction image data having undergone the gradation conversion processing in step S602 are combined on the basis of the combining ratio calculated in step S608. In step S610, it is determined whether or not steps S601 to S609 are performed on all of the pixels of the image data. If not performed on all of the pixels, the process returns to step S601 and is repeated up to step S609. When it is determined in step S610 that the aforementioned steps have been performed on all of the pixels, the combined data is output to the image compressor 107 and undergoes image compression processing in step S611. The combined data is recorded and stored in the storage medium 108, thereby ending the process.

By combining the pre-noise-reduction image data and the post-noise-reduction image data in this manner, noise can be reduced while maintaining the resolution of the image scene. Furthermore, since the combining ratio is controlled on the basis of the gradation conversion characteristic and the image characteristics, such as the brightness information, the edge information, and the color information, the noise can be more intensively reduced in areas where the noise is made noticeable as the result of gradation conversion processing, while the resolution can be maintained in other areas, and a high quality image can be obtained, owing to finer control based on the image characteristics.

In all of the embodiments described above, gradation conversion processing can be appropriately performed by selectively using space-invariant gradation conversion processing and space-variant gradation conversion processing. In particular, when performing space-variant gradation conversion processing, noise can be more intensively reduced in areas where the noise is made noticeable as the result of space-variant gradation conversion processing, while the resolution can be maintained in other areas. In addition, the brightness and the contrast of the image scene can be appropriately adjusted for each area of the image scene, whereby the dynamic range can be expanded.

The image processing device according to each of the above-described embodiments can be applied to products, such as a stationary camera for broadcasting, an electronic news-gathering (ENG) camera, a consumer-oriented hand-held camera, and a digital camera. Furthermore, the aforementioned image processing device can also be applied to an image-signal correction program (CG program) that handles moving images or to an image editing device.

The series of image processing steps described above for creating a combined image can be executed using hardware, but can also be executed using software. In the latter case, a program for executing the aforementioned series of image processing steps as software may be preliminarily stored in a storage medium, so that predetermined processing can be executed by loading various programs from the storage medium into a computer built in predetermined hardware or a general-purpose personal computer.

What is claimed is:

1. An image processing device comprising:
    a gradation conversion processor that performs gradation conversion processing on image data from an image acquisition system based on a gradation conversion characteristic;
    a noise reduction processor that performs noise reduction processing on the image data;
    a combining-ratio calculator that calculates a combining ratio between the image data before the noise reduction processing performed by the noise reduction processor and the image data after the noise reduction processing based on of the gradation conversion characteristic; and
    a combiner that combines the image data before the noise reduction processing performed by the noise reduction processor and the image data after the noise reduction processing based on the combining ratio,
    wherein the combining-ratio calculator calculates the combining ratio based on image characteristics and the gradation conversion characteristic,
    wherein the image characteristics include brightness information, edge information, and color information of an image, and
    wherein the gradation conversion characteristic includes an amplification factor for gradation conversion.

2. The image processing device according to claim 1, further comprising a noise-reduction control-value calculator that calculates a noise-reduction control value, used for controlling a magnitude of the noise reduction processing performed by the noise reduction processor, based on at least one of the (i) image characteristics and (ii) the gradation conversion characteristic,
    wherein the noise reduction processor performs the noise reduction processing on the image data after the gradation conversion processing based on the noise-reduction control value so as to generate noise-reduced data.

3. The image processing device according to claim 1, wherein the gradation conversion characteristic is a space-invariant gradation conversion characteristic set in advance in a freely-chosen manner or calculated from the image data, and wherein the gradation conversion processor performs space-invariant gradation conversion processing on the image data based on the gradation conversion characteristic.

4. The image processing device according to claim 1,
    wherein the gradation conversion characteristic is a space-variant gradation conversion characteristic calculated from the image data, and
    wherein the gradation conversion processor performs space-variant gradation conversion processing on the image data based on the gradation conversion characteristic.

5. An image processing method comprising:
    performing gradation conversion processing on image data from an image acquisition system based on a predetermined gradation conversion characteristic;
    performing noise reduction processing on the image data;
    calculating a combining ratio between the image data before the noise reduction processing is performed and the image data after the noise reduction processing is performed based on the gradation conversion characteristic; and
    combining the image data before the noise reduction processing is performed and the image data after the noise reduction processing is performed based on the combining ratio,
    wherein the combining ratio is calculated based on image characteristics and the gradation conversion characteristic,
    wherein the image characteristics include brightness information, edge information, and color information of an image, and
    wherein the gradation conversion characteristic includes an amplification factor for gradation conversion.

6. A computer-readable storage device having stored therein an image processing program that is executable by a computer to perform functions comprising:
    performing gradation conversion processing on image data based on a predetermined gradation conversion characteristic;
    performing noise reduction processing on the image data;
    calculating a combining ratio between the image data before the noise reduction processing is performed and the image data after the noise reduction processing is performed based on the gradation conversion characteristic; and
    combining the image data before the noise reduction processing is performed and the image data after the noise reduction processing is performed based on the combining ratio,
    wherein the combining ratio is calculated based on image characteristics and the gradation conversion characteristic,
    wherein the image characteristics include brightness information, edge information, and color information of an image, and
    wherein the gradation conversion characteristic includes an amplification factor for gradation conversion.

* * * * *